United States Patent
Moulden et al.

(10) Patent No.: US 9,495,208 B2
(45) Date of Patent: Nov. 15, 2016

(54) PROACTIVE PRESENTATION OF MULTITASK WORKFLOW COMPONENTS TO INCREASE USER EFFICIENCY AND INTERACTION PERFORMANCE

(71) Applicant: Microsoft Technology Licensing, LLC, Redmond, WA (US)

(72) Inventors: Angela Moulden, North Bend, WA (US); Neal Osotio, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/560,790

(22) Filed: Dec. 4, 2014

(65) Prior Publication Data

US 2016/0162332 A1    Jun. 9, 2016

(51) Int. Cl.
| | | |
|---|---|---|
| G06F 9/46 | (2006.01) | |
| G06F 9/48 | (2006.01) | |
| G06F 3/0484 | (2013.01) | |
| G06F 9/44 | (2006.01) | |

(Continued)

(52) U.S. Cl.
CPC ......... *G06F 9/4881* (2013.01); *G06F 3/04842* (2013.01); *G06F 9/4443* (2013.01); *G06Q 30/0241* (2013.01); *G06Q 50/00* (2013.01)

(58) Field of Classification Search
CPC ............. G06F 9/4881; G06F 3/04842; G06F 9/4443; G06Q 10/06; G06Q 10/06311; G06Q 10/06312; G06Q 10/06313; G06Q 10/0633; G06Q 30/0241; G06Q 50/00
USPC .................................. 717/101–103; 718/107
See application file for complete search history.

(56) References Cited

U.S. PATENT DOCUMENTS

| | | | | |
|---|---|---|---|---|
| 7,565,340 B2* | 7/2009 | Herlocker | .............. | G06Q 10/10 706/52 |
| 8,326,859 B2* | 12/2012 | Paek | ..................... | G06Q 10/10 707/767 |

(Continued)

OTHER PUBLICATIONS

Lokaiczyk et al., "Exploiting Context Information for Identification of Relevant Experts in Collaborative Workplace—Embedded E-Learning Environments", 2007, Springer-Verlag Berlin Heidelberg, pp. 217-231.*

(Continued)

*Primary Examiner* — Ted T Vo
(74) *Attorney, Agent, or Firm* — Steven Spellman; Tom Wong; Micky Minhas

(57) ABSTRACT

A multitask workflow is proactively identified based upon user context information. For discrete tasks of the multitask workflow, modules directed to such tasks are identified from among other modules also directed to the same task, and are proactively presented to the user. Modules are selected based upon predetermined values associated with such modules, which can be indicative of capabilities, relationships, incentives associated with presentation of the modules to the user, and other like valuations. The modules offer visually enticing experiences to aid the user in performing a task, of the multitask workflow, and thereby increasing the user's interaction performance. Additionally, the modules exchange information to increase user efficiency in performing the multitask workflow. Multiple computing devices associated with a user can execute different modules of the multitask workflow, enabling two or more users to collaborate on the multitask workflow or otherwise research and perform tasks associated with the multitask workflow.

20 Claims, 5 Drawing Sheets

(51) Int. Cl.
*G06Q 30/02* (2012.01)
*G06Q 50/00* (2012.01)

(56) References Cited

U.S. PATENT DOCUMENTS

| 8,355,928 B2* | 1/2013 | Spahn | G06F 19/321 |
|---|---|---|---|
| | | | 382/128 |
| 2009/0216435 A1 | 8/2009 | Zheng et al. | |
| 2009/0300488 A1 | 12/2009 | Salamon et al. | |
| 2012/0213212 A1 | 8/2012 | Moore et al. | |
| 2014/0188956 A1 | 7/2014 | Subba et al. | |

OTHER PUBLICATIONS

Molina et al., "A Template-Based Mechanism for Dynamic Service Composition Based on Context Prediction in Ubicomp Applications", 2007, 19th IEEE ICTAI-07, 8 pages.*

Ardissono et al., "A framework for the management of context-aware workflow systems", 2007, in Proc. of WEBIST 2007, 9 pages.*

"International Search Report and Written Opinion Issued in PCT Application No. PCT/US2015/063413", Mailed Date: Feb. 16, 2016, 13 Pages.

* cited by examiner

PROACTIVE PRESENTATION OF MULTITASK WORKFLOW COMPONENTS TO INCREASE USER EFFICIENCY AND INTERACTION PERFORMANCE

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Because a diverse set of individuals can consume various content, such as television shows, or newspapers, the advertising included with such content necessarily is exposed to both individuals to whom such advertising is relevant, and individuals that have no interest in the advertised product or service. Additionally, because information about the individuals consuming such content is often unavailable, and because there is no prior knowledge on which individuals will consume which content, it can be difficult to determine beforehand which advertising will be relevant. As a result, individuals have become accustomed to finding advertisements irrelevant for their particular needs and ignoring such advertisements. Indeed, many consumers of advertising-supported content have trained themselves to purposely ignore advertisements; a behavior known as "ad blindness." For example, readers of newspapers or magazines visually skip over advertisements often without noticing the advertisements sufficiently in order to actually determine whether or not such advertisements are of interest. As another example, watchers of network television shows often perform other actions during displayed advertising, or utilize devices, such as digital video recorders that enable such watchers to fast-forward or skip over advertising without actually considering the advertising content.

Ad blindness can prevent users from receiving helpful information and assistance, whether from advertisements or otherwise, since users can be predisposed to ignore anything other than a single task for which the user is utilizing a computing device at a given instant in time. Within the context of multitask workflows, users ignoring advertisements or other like content can reduce their interaction performance as they manually proceed through each task of the multitask workflow, and manually cycle between tasks to carry over relevant information. Such actions, on the part of a user, also reduce the user's efficiency in performing and completing a multitask workflow.

SUMMARY

A multitask workflow that a user is likely to engage in can be proactively identified based upon information regarding that user's context. For discrete tasks of the multitask workflow, a module directed to such a task can be identified from among other modules also directed to the same task, and such an identified module can be proactively presented to the user to aid the user in performing the multitask workflow. Modules can be sourced from multiple independent authors or developers, and can be specifically directed to functions or services offered by an entity associated with such authors or developers. User interaction with modules directed to tasks of a multitask workflow can inform the subsequent selection of further modules directed to other tasks of the multitask workflow. Additionally, modules can be selected based upon predetermined values associated with such modules. Such values can be indicative of capabilities of the modules, relationships between modules, incentives associated with presentation of the modules to the user, and other like valuations. The modules can offer visually enticing experiences to aid the user in performing a task, of the multitask workflow, and thereby increasing the user's interaction performance. Additionally, the modules can exchange information to increase user efficiency in performing the multitask workflow. Multiple computing devices associated with a user can execute different modules of the multitask workflow, enabling two or more users to collaborate on the multitask workflow or otherwise research and perform tasks associated with the multitask workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
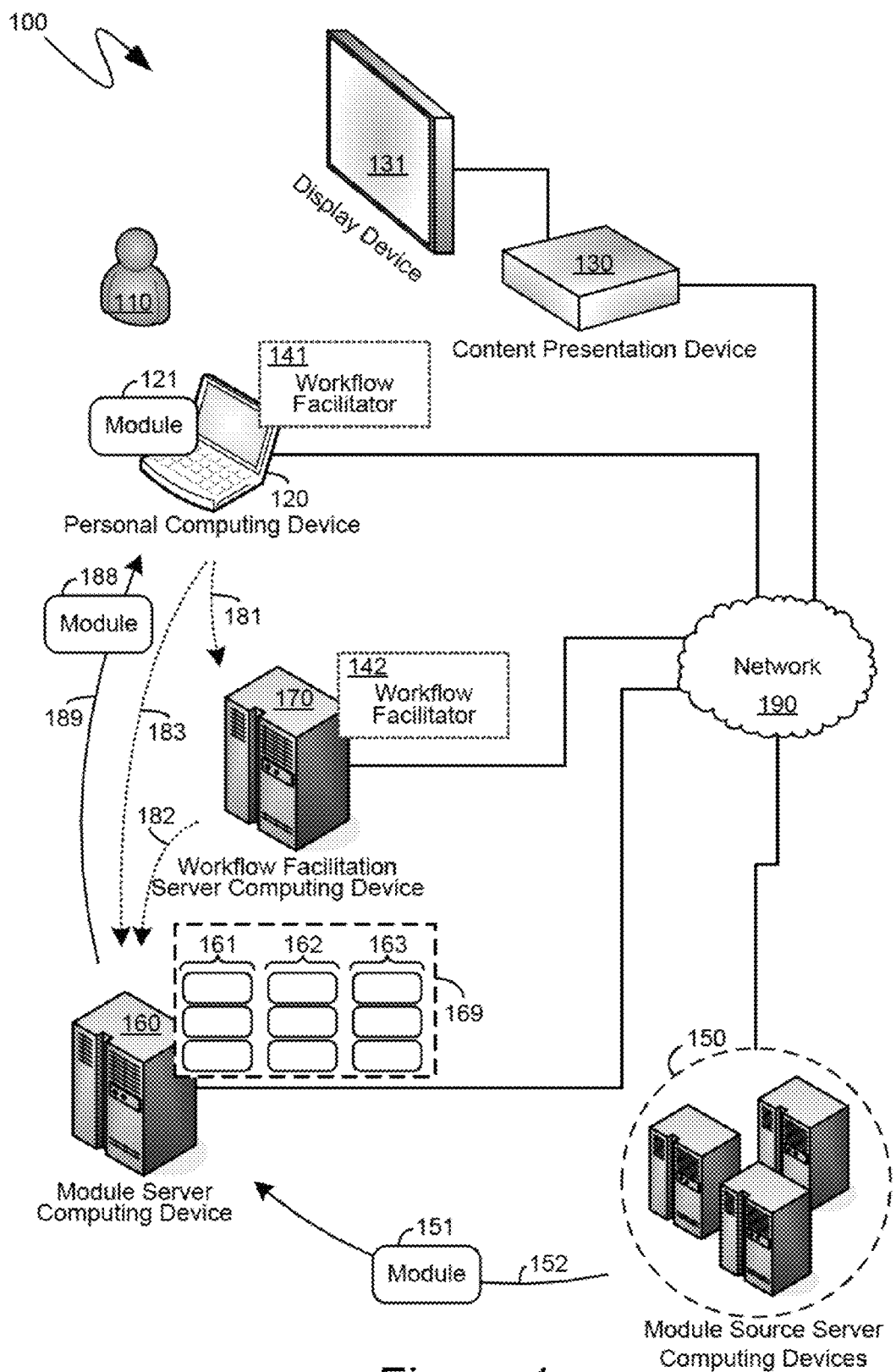
FIG. 1 is a block diagram of an exemplary system for improving multitask workflow performance.

The following description relates to improving users' interaction performance with one or more computing devices in performing a multitask workflow and also relates to increasing user efficiency in performing a multitask workflow utilizing such computing devices. To accomplish such improvements and increases in efficiency, a multitask workflow that a user is likely to perform utilizing one or more computing devices can be proactively identified based upon information regarding that user's context. For discrete tasks of the multitask workflow, a module directed to such a task can be identified from among other modules also directed to the same task, and such an identified module can be proactively presented to the user to aid the user in performing the multitask workflow. Modules can be sourced from multiple independent authors or developers, and can be specifically directed to functions or services offered by an entity associated with such authors or developers. User interaction with modules directed to tasks of a multitask workflow can inform the subsequent selection of further modules directed to other tasks of the multitask workflow. Additionally, modules can be selected based upon predetermined values associated with such modules. Such values can be indicative of capabilities of the modules, relationships between modules, incentives associated with presentation of the modules to the user, and other like valuations. The modules can offer visually enticing experiences to aid the user in performing a task, of the multitask workflow, and thereby increasing the user's interaction performance. Additionally, the modules can exchange information to increase user efficiency in performing the multitask workflow. Multiple computing devices associated with a user can execute different modules of the multitask workflow, enabling two or more users to collaborate on the multitask workflow or otherwise research and perform tasks associated with the multitask workflow.

The techniques described herein make reference to advertising contexts within which selection of information to present to a user is based, at least in part, upon an amount of money paid, such as by an advertiser, to have the information presented to a user. However, such descriptions are not meant to suggest a limitation of the described techniques to advertising or revenue-generating contexts. To the contrary, the described techniques are equally utilizable with any ranking or value-assigning mechanisms. Additionally, the described techniques are equally applicable to proactive presentation of any modules to facilitate a multitask workflow. Consequently, as utilized herein, the word "value" does not necessarily connote a monetary categorization, and, instead, simply means a priority or ranking that is pre-assigned.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. As illustrated in FIG. 1, the exemplary system 100 can comprise a personal computing device, such as the exemplary personal computing device 120, which can be utilized by a user, such as the user 110. Although not specifically illustrated in FIG. 1, the user's utilization of the personal computing device 120, together with other information about the user 110, the personal computing device 120, or combinations thereof, can be part of a user context that can be utilized to proactively present module-based assistance to increase the user's efficiency in performing multitask workflows, and increase the user's interaction performance with the personal computing device 120, other computing devices associated with the user 110, such as exemplary content presentation device 130, or combinations thereof.

According to one aspect, a workflow facilitator can execute, either on the exemplary personal computing device 120, such as in the form of the exemplary workflow facilitator 141, or on a server computing device remote from the personal computing device 120 and communicationally coupled thereto, such as the exemplary workflow facilitation server computing device 170, on which can execute the exemplary workflow facilitator 142. The workflow facilitator can also execute on combinations thereof. As illustrated by the exemplary system 100, the exemplary workflow facilitation server computing device 170 can be communicationally coupled to the exemplary personal computing device 120 via the network 190. The exemplary workflow facilitators 141 and 142 are illustrated via dashed lines in FIG. 1 to signify that they can be alternatives of one another, or distributed components that can work together, such as across the network 190.

To aid the user in performing a multitask workflow, and thereby increase the user's efficiency, as well as facilitate greater interaction performance with various computing devices through which the user will be performing such a multitask workflow, a workflow facilitator can present, to the user, through one or more computing devices, task-centric modules that can be directed to specific tasks of the multitask workflow. Such modules can be obtained, such as by the workflow facilitator, from a module server computing device, such as the exemplary module server computing device 160 shown in the system 100 of FIG. 1. A module server computing device, such as exemplary module server computing device 160, can comprise a module store 169, or other like organization of modules, in which modules can be classified, categorized, or organized in accordance with the tasks to which such modules are directed. Thus, for example, the exemplary module store 169 is illustrated in FIG. 1 as comprising exemplary groupings of modules 161, 162 and 163, where each module in a grouping, or set, of modules can be directed to an equivalent task. For example, all of the modules in the exemplary set of modules 161 can each, individually, be directed to an equivalent task such as, for example, reserving a hotel room. By way of another example, all of the modules in the exemplary set of modules 162 can, similarly, each be, individually, directed to another equivalent task such as, for example, purchasing airline tickets.

According to one aspect, individual modules can increase user interaction performance by offering visually stimulating interfaces by which a user can be provided with relevant information to facilitate performance of the task to which the module is directed. Such modules can also take advantage of the ability to present rich, or graphically engaging, interfaces to present the user with a sufficient quantity of information to minimize the user's need to obtain information outside of the module. In such a manner modules can increase user efficiency by enabling the user to focus on, and stay within the context of, the user interface presented by a module.

Tasks to which modules can be directed can include tasks which entail a user purchasing goods or services being offered by vendors or other providers of such goods or services. Consequently, it can be advantageous, including being financially advantageous, for a particular provider of a good or service to generate a module that offers a graphically engaging interface, providing the user with relevant information and thereby facilitating the user's purchase of the good or service being offered by such a provider. For example, it can be advantageous for a specific airline to have generated, either by itself directly, or on its behalf, a module that provides a graphically engaging interface to increase user interaction performance with such a module, and which provides the user with an ability to efficiently purchase airline tickets for flights on such a specific airline.

Such a module can be designed to present, to the user, a graphical user interface offering capabilities and information that may be difficult or inefficient to offer in other contexts. For example, as will be recognized by those skilled in the art, users often complete tasks through interfaces provided by the webpages of product or service providers. However, as will also be recognized by those skilled in the art, the interfaces of such webpages, presented to users through web browsers executing on computing devices being utilized by such users, can be limited in the graphics that can be rendered, the information that can be displayed, and the interactivity that can be enabled through such web browsers. Often, such limitations can be due to security concerns. Custom-designed modules, can avoid such limitations by executing either directly on a computing device being utilized by user, a server computing device, or combinations thereof, outside of the context of a web browser. Alternatively, or in addition, modules can execute within the context of a web browser, except that the additional information provided by such modules can be more tailored to the user's computing experience such as, for example, whether the user is utilizing a tablet computing device, smartphone computing device, or other like computing device.

The exemplary system 100, shown in FIG. 1, modules, such as the exemplary module 151, can be communicated to the module server computing device 160 via communications, such as exemplary communication 152, from one or more module source server computing devices, such as the exemplary module source server computing devices 150. As indicated previously, individual providers of goods or services can desire to provide such modules in order to increase user efficiency and further facilitate the user's purchase of the goods or services being offered by such providers. Consequently, such providers, or other module authors, can provide modules, such as the exemplary module 151, from their computing devices, such as the exemplary module source server computing devices 150, to the module server computing device 160.

According to one aspect, the provision of modules to a module server computing device, such as exemplary module server computing device 160, can comprise the provision of module metadata that can identify aspects of the provided modules. For example, the provision of a module, such as to the module server computing device 160, can entail an identification of one or more tasks to which such a module is directed. Additionally, the provision of a module, such as to the module server computing device 160, can also entail the provision of value information, or information from which the value can be derived for the provided module. As a simple example, one form of value information can be a specification of a financial benefit that will be paid out if the module is presented to a user, if a user utilizes the module to purchase a good or service, or other like threshold events. As another example, another form of value information can be a specification of a type of user, or type of user context, when it would be desirable, such as to the author or provider of such a module, to have the module displayed to a user. Such information can then be retained by the module server computing device 160 and utilized, such as by one of the workflow facilitators, to identify a specific module to present to a user to facilitate a user's performance of one task of a multitask workflow.

More specifically, as illustrated by the communications 181, 182 and 183, a workflow facilitator, whether the exemplary workflow facilitator 141, executing on the personal computing device 120, the exemplary workflow facilitator 142, executing on the workflow facilitation server computing device 170, or combinations thereof, can monitor a user context and can predict a multitask workflow that the user 110 is likely to undertake, based upon the user context. Subsequently, in communication with the module server computing device 160, a module, such as exemplary module 188, can be selected to facilitate the user's performance of one task of the identified multitask workflow. Such a module can be communicated to the personal computing device 120, as illustrated by the communication 189.

The communication of a module, such as the exemplary module 188, to a personal computing device being utilized by a user, such as exemplary personal computing device 120, can entail the provision of computer-executable instructions that can enable the module to execute on the personal computing device 120, that can enable only a portion of the module to execute on the personal computing device 120, while other portions of the module execute on remote computing devices and communicate with the portion executing on the personal computing device 120 through network communications, such as via the network 190, or the communication of information to be displayed on the personal computing device 120 from computer-executable instructions executing on remote computing devices. Alternatively, or in addition, modules can be provided to personal computing devices in advance, and can be stored on such personal computing devices, such as, for example, as illustrated in the exemplary system 100 by the module 121, which is shown as being locally stored on the exemplary personal computing device 120. In such a situation, the communication 189 can be nothing more than an identification of the locally-stored module 121, or other like instantiation of the locally-stored module 121.

Figure 2:
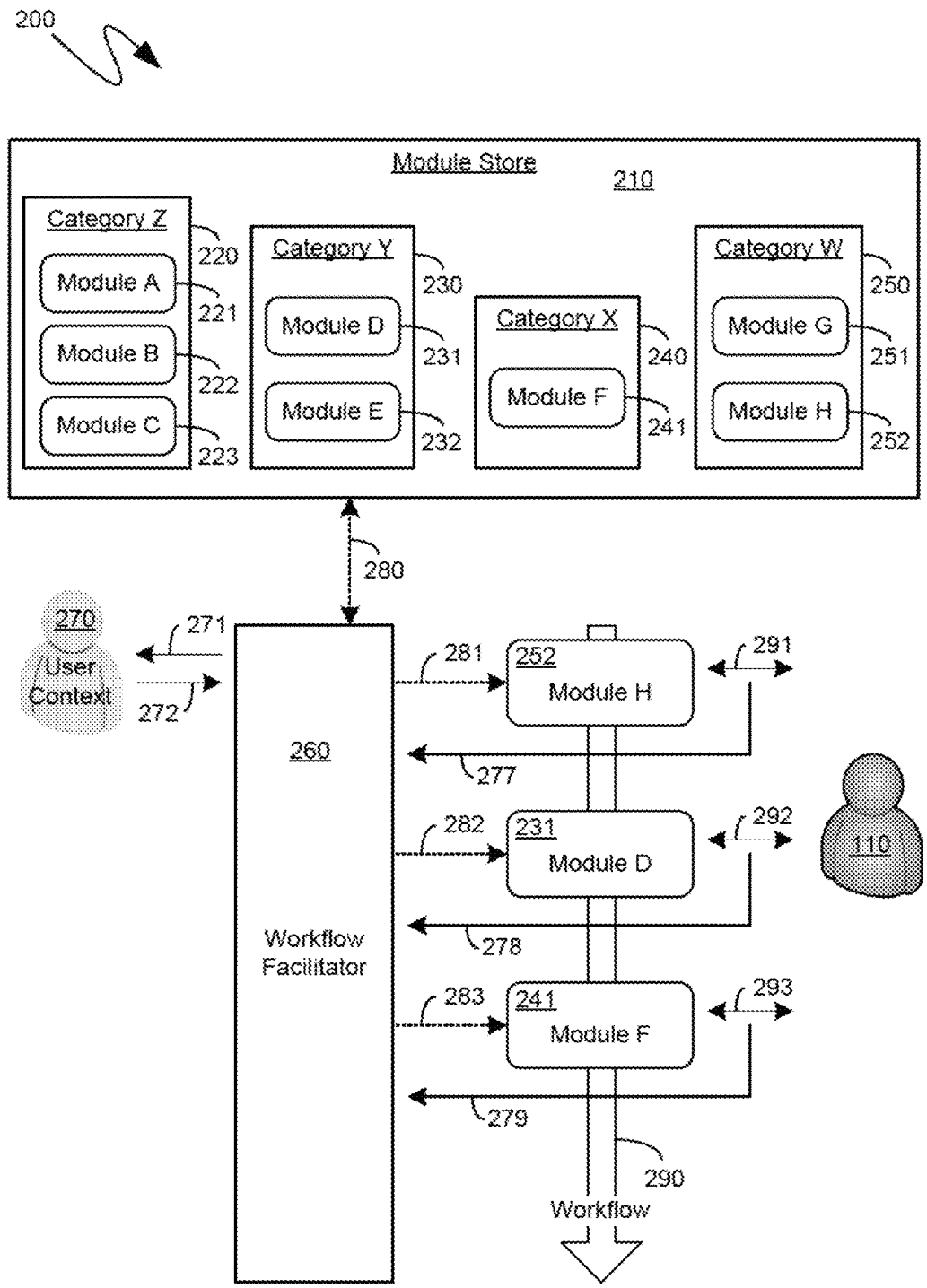
FIG. 2 is a block diagram of an exemplary system for proactively presenting multitask workflow components to a user.

Turning to FIG. 2, the exemplary system 200 shown therein illustrates an exemplary operation of a workflow facilitator, such as the exemplary workflow facilitator 260, in selecting and presenting modules to a user, such as exemplary user 110, to increase the user's efficiency in performing multitask workflows. Initially, the workflow facilitator 260 can monitor a user context, such as exemplary user context 270, and obtain information therefrom, such as is illustrated by the arrows 271 and 272. A user context, such as exemplary user context 270, can comprise information indicative of the user 110, including current information about the user 110 and historical information compiled from prior actions of the user 110.

To protect users' privacy, users would be required to take one or more affirmative actions before their personal information could be collected and stored, and, in the absence of such affirmative action, their personal information would not be collected. From the users' perspective, there can be meaningful benefits to allowing access to some discrete portion of their personal information. For example, users may allow access to personal information simply because they desire the afore-mentioned benefits of proactively triggered assistance in performing multitask workflows. As another example, users can be provided with additional services, or benefits, in exchange for providing, or allowing access to, some of their personal information. As yet another example, users can be compensated, either monetarily or through products and services, in exchange for providing, or allowing access to, some of their personal information.

As indicated, the user context 270, which can comprise both personal information about the user 110, as well as non-user-specific information, can be utilized, such as by the workflow facilitator 260, to proactively identify a multitask workflow that is anticipated the user 110 will seek to perform. Consequently, the user context 270 can comprise information that can aid the workflow facilitator 260 in proactively identifying that multitask workflow. For example, the user context 270 can comprise recent web browsing activity of the user 110, which, as will be recognized by those skilled in the art, can be indicative of a user's current interests. As another example, user context 270 can comprise user-centric calendar information, which can include prior trips or vacations the user 110 can have taken, prior dates for events of significance to the user 110, such as their wedding anniversary, their birthday, and the like, and other like user-centric calendar information. As yet another example, the user context 270 can comprise geographic and temporal information, such as a current time, a current physical location of the user, and the like.

User context information, such as the exemplary user context information 270, can also include information about the user 110 from other computing devices associated with the user 110. For example, the user 110 can be utilizing a personal computing device, such as a laptop, to browse or review email, while others affiliated with the user 110, such as the user's children, can be utilizing a content presentation device associated with the user 110 to watch a movie. The user context information 270 can, in such an example, include information indicative of the movie being viewed on the other content presentation device, as well as the browsing being performed by the user on their laptop.

Utilizing the user context information 270, the workflow facilitator 260 can predict a multitask workflow that the user 110 will likely next engage in. For example, if the user context 270 comprises information indicative of a content presentation device associated with the user 110 being utilized to view a popular children's movie while the user's calendar is indicative of an upcoming vacation, the workflow facilitator 260 can predict that the user 110 likely engage in a multitask workflow directed to planning a family trip to a resort or amusement park associated with the children's movie that is being viewed on the content presentation device. As another example, if the user context information 270 comprises information indicative of the user's upcoming wedding anniversary, as well as information indicative of the user being located in a foreign city until after their wedding anniversary, the workflow facilitator 260 can predict that the user 110 will likely engage in a multitask workflow directed to planning for their spouse to join them in the foreign city and celebrate their wedding anniversary including, for example, hotel and restaurant reservations.

Once the workflow facilitator 260 has identified a multitask workflow that it is anticipated the user will seek to engage in, the workflow facilitator 260 can communicate with a module store, such as exemplary module store 210, to select a first module to present to the user 110. More specifically, the identified multitask workflow can comprise multiple discrete tasks, and a module, selected from the module store 210, by the workflow facilitator 260, can be directed to one of those tasks. For example, trip planning can include the discrete tasks of purchasing airline tickets, renting a rental car, reserving a hotel, making restaurant reservations, and other like discrete tasks. As another example, event planning can include reserving an event area, purchasing catering services, generating announcements, and other like discrete tasks.

The workflow facilitator 260 can select one of those tasks and can then communicate, as illustrated by the communication 280, with the module store 210, and, thereby, select a module to present to the user, where such a module can provide the user with a graphically engaging user interface that can increase the user's interaction performance and increase the user efficiency in performing the task to which such a module is directed. As indicated previously, according to one aspect, the module store 210 can comprise modules categorized in accordance with different categories that can be indicative of the tasks to which the modules are directed. For example, the exemplary modules 221, 222 and 223, in the exemplary category 220 can each, individually, be directed to analogous tasks. By way of a specific example, each of the modules 221, 222 and 223 can be directed to the task of purchasing airline tickets. Continuing with such a specific example, the exemplary module 221 can be directed to the task of purchasing airline tickets from one specific airline, while the exemplary module 222 can be directed to purchasing airline tickets from another, different airline. By way of illustration, and still continuing with the above, specific example, the exemplary module 223 can be directed to purchasing airline tickets, including from the specific airlines represented by the exemplary modules 221 and 222, through an airline ticket broker, or other like intermediary. As can be seen from such a specific example, the tasks to which each of the individual modules in the exemplary category 220 are directed can be analogous to one another. For example, each of the exemplary modules 221, 222 and 223 were directed to airline ticket purchasing tasks in the specific example provided above.

Consequently, to select a module to present to the user 110, the workflow facilitator 260 can initially reference an appropriate category of modules, within the module store 210. The workflow facilitator 260 can then select a specific module, from among the set of modules in such a category. According to one aspect, such a selection can be made based upon a value that has been assigned to individual modules. For example, the value assigned to a specific module can be representative of a compensation that will be received, such as by a system providing such multitask workflow assistance, if a specific threshold, associated with the presentation of the module to the user 110, is reached. Such a threshold can include the mere presentation of the module to the user 110, the utilization, of the module, by the user 110, to purchase a good or service being offered by the module, or some other like threshold. As another example, the value assigned to a specific module can be representative of a relevance of the module to the user 110, given the user context 270. For example, modules that are associated with entities that are partners of one another can have higher value when they are presented together as part of a multitask workflow. By way of a specific, illustrative example, the workflow facilitator 260 can select a module to present to the user 110 that can be associated with a hotel reservation task.

As indicated previously, such a module can have been created by, or on behalf of, a specific chain of hotels and can enable the user 110 to reserve rooms at hotels belonging to such a chain. Such a hotel chain can share a partnership with a specific airline. In such an instance, subsequent to the presentation of a module from that hotel chain, a corresponding air travel module associated with the airline with which that hotel chain is partners can be assigned a higher value in light of the user's prior interaction with the hotel module.

As indicated previously, and as illustrated by the communication 280, once the workflow facilitator 260 has identified a multitask workflow 290 that the user 110 will likely engage in, the workflow facilitator 260 can select a module from a specific category, such as from one of the categories 220, 230, 240 and 250 illustrated in the exemplary module store 210, and can proactively present such a module to the user 110. In combination with the communication 280, the dashed arrow 281 illustrates the selection of the module 252 for presentation to the user 110. More specifically, the workflow facilitator 260 can determine a task to be performed first, from among the tasks of the multitask workflow 290. The modules directed to such a task can have been categorized into a single category, and the workflow facilitator 260 can select from among the modules in such a category. In selecting which task should the user be aided in performing first, such as by the proactive presentation of a module, such as the exemplary module 252, the workflow facilitator 260 can take into account information, such as the user context 270, indicative of the user's most recent actions. For example, returning to the above example where the user 110 was browsing on a laptop computing device, while a content presentation device that is also associated with the user was displaying a children's movie to the user's children, the workflow facilitator 260 can have determined that the multitask workflow 290 which the user would likely perform next can be a multitask workflow directed to planning a family vacation to a resort associated with the children's movie. In such an example, the first module proactively presented to the user 110, such as exemplary module 252, can be a module to aid the user 110 in exploring the resort and reserving rooms at such a resort. Consequently, the exemplary module 252, directed to, for example, reserving rooms at the resort, can be presented to the user 110 even though, from a chronological perspective, the user 110 would likely utilize airline travel prior to their checking in to the resort.

Continuing with such an illustrative example, the module 252, proactively presented to the user 110, can be, in such a specific, illustrative example, a module for reserving a hotel room at a specific resort. As indicated previously, module 252, in such an example, can have been provided by, or on behalf of, that specific resort, and can be designed to entice the user 110, thereby increasing the user's interaction performance, as well as increasing the user's efficiency by providing a graphically engaging interface through which the user can quickly obtain information desirable to the user and efficiently complete the task of reserving a hotel room at that resort. The exemplary module 252 can have been selected from other modules, such as exemplary module 251, all of which can have been categorized together in the exemplary category 250. In the context of the above-provided illustrative example, the category 250 can be a hotel reservation category, resort category, or the like.

User interaction with the module 252, such as the exemplary resort module described in the specific example above, is illustrated in the exemplary system 200 of FIG. 2 as the interaction 291. Such interaction 291 can serve as another input 277 to the workflow facilitator 260 to enable the workflow facilitator 260 to select a subsequent module of the multitask workflow 290. For example, returning to the above, specific example of the user 110 planning a vacation, the next module presented by the workflow facilitator 260, such as exemplary module 231, can be a module directed to, for example, purchasing airline travel from the location of the user 110 to the resort associated with a previously presented module 252. As indicated previously, in selecting the exemplary module 231, the workflow facilitator 260 can consider other modules, from among the set of modules categorized into the category 230, which, in the present example, can be an airline travel category, or an airfare purchasing category. Such other modules can include the exemplary module 232, which can have a lower value assigned to it than, for example, the exemplary module 231. Consequently, the workflow facilitator 260 can, via the communication 280, select the exemplary module 231.

In selecting and presenting the module 231, represented by the dashed arrow 282, the workflow facilitator 260 can have taken into account information from the user context 270 such as, for example, the physical location of the user 110. Thus, for example, in the above, specific example, the airline module 231 can have the user's origin prefilled based upon the user's current geographic location, such as could be obtained from the user context 270, and can also have the user's destination prefilled, such as based upon the location of the resort associated with the module 252. As another example, again within the context of the above, specific example, the airline module 231 can have the dates of travel prefilled based upon the interaction 291 between the user 110 and the resort module 252. Such information can be part of the input 277, obtained from the interaction 291, which can be provided directly to the workflow facilitator 260, or, alternatively, can be made part of the user context 270, and the workflow facilitator 260 can obtain such information therefrom, such as is illustrated by the communications 271 and 272. In such a manner, user efficiency in coordinating multiple aspects of the multitask workflow can be made more efficient.

In a like manner, the user interaction 292 between the user 110 and the exemplary module 231, can be provided as a subsequent input 278, such as to the workflow facilitator 260, to enable the workflow facilitator 260 to select yet a subsequent module, such as the exemplary module 241, to enable the user 110 to perform other tasks of the multitask workflow 290. As with the selection of the exemplary module 231, the workflow facilitator 260 can communicate with the module store 210, as illustrated by the communication 280, to select a module from an appropriate category, such as the exemplary category 240. The selected module, such as the exemplary module 241, can then be presented, by the workflow facilitator 260, to the user 110, as represented by the dashed arrow 283. The user interaction 293 with such an exemplary module 241 can then, again, be provided as input 279 to the workflow facilitator 260. In such a manner the workflow facilitator 260 can proactively present multiple modules to a user, where each of the practically presented modules can be directed to one task from among a multitask workflow, such as the exemplary multitask workflow 290.

Figure 3:
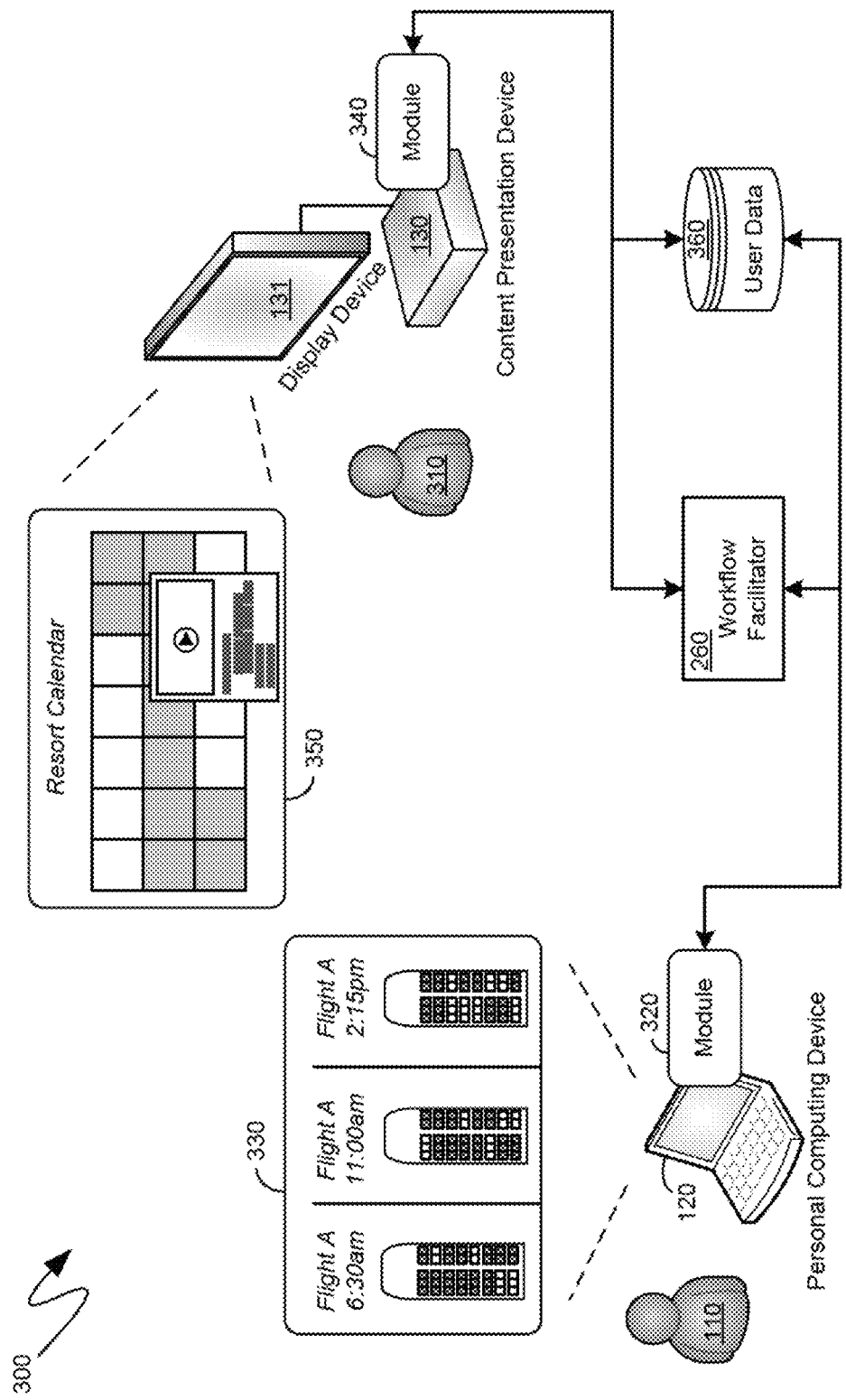
FIG. 3 is a block diagram of an exemplary system for improving multitask workflow performance across multiple users and devices.

Turning to FIG. 3, the system 300 shown therein illustrates an exemplary multi-device aspect of the above-described mechanisms. More specifically, and as illustrated in FIG. 3, a user 110 can be utilizing a computing device, such as the exemplary personal computing device 120, to interact with a module, such as the exemplary module 320. As described above, the user interface presented by such an exemplary module 320, such as via a physical display device that is communicationally coupled with the personal computing device 120, including being built-in to the personal computing device 120, can comprise a graphically engaging user interface that can increase the interaction performance of the user 110, such as with the personal computing device 120. More specifically, the execution of computer-executable instructions, of which the module is comprised, by one or more processing units results in physical modifications to the physical display device that are perceived by human users as graphical image elements. As indicated previously, the one or more processing units executing the computer-executable instructions of which the module is comprised can be physically present as part of the personal computing device 120, one or more server computing devices to which the personal computing device 120 is communicationally coupled, or combinations thereof. As exemplarily illustrated in FIG. 3, the exemplary module 320 can be a module directed to enabling the user 110 to purchase airline tickets, such as on a particular airline from whom the module 320 was obtained, or on whose behalf the module 320 was created. As such, the module 320 can generate an exemplary user interface 330 that can enable the user 110 to perform the task to which the module 320 is directed, such as, in the present example, the purchasing of airline tickets.

In interacting with the module 320, the user 110 can generate information that can be provided, from the module 320, to the workflow facilitator 260, the user data 360, or combinations thereof. Such information can then be utilized by other modules, executing on other computing devices, that can enable other users, such as exemplary user 310, to interact with other aspects or tasks of the multitask workflow to which the user 110 is directed. By way of an illustrative example, the exemplary user 310 can be interacting with the content presentation device 130, having communicationally coupled thereto a display device 131 on which a user interface can be graphically presented to the exemplary user 310. Exemplary content presentation device 130 can have, executing thereon, or otherwise communicating therewith, a module 340 that can, in the example illustrated in FIG. 3, be directed to event planning within the context of events offered at a resort. As before, the module 340 can generate a user interface that can be graphically engaging and can, thereby, increase the interaction performance of the exemplary user 310, such as with the content presentation device 130. Additionally, module 340 can generate a user interface that can enable the user 310 to more efficiently perform various tasks to which the module 340 is directed such as, for example, tasks related to the scheduling and reserving of events at a resort. For example, a user interface generated by the module 340, such as exemplary user interface 350, can comprise videos and interactive aspects by which the user 310 can more accurately identify activities at the resort that may be of interest to them.

According to one aspect, input provided by the user 110, to the module 320, such as via the personal computing device 120, can affect the information presented by the module 340, to the user 310, such as via the content presentation device 130, and corresponding display device 131. By way of a simple, illustrative example, if the user 110 determines that more convenient departure flights are available on a subsequent day, and, via the module 320, selects such a subsequent day, a calendar, such as that presented by the module 340, to enable the user 310 to select events, can be automatically updated with the new arrival information, in light of the interactions between the user 110 and the module 320. More specifically, as the user 110 selects a different day on which to travel to the resort, such information can be communicated, such as by the module 320, to the workflow facilitator 260, can be stored into the user data 360, or combinations thereof. The exemplary module 340 can, likewise, be in communication with the workflow facilitator 260, the user data 360, or combinations thereof, and can, thereby, obtain information indicative of the different day that the user 110 selected, such as via the module 320, to travel to the resort. The exemplary module 340 can then generate a user interface, such as exemplary user interface 350, which can be updated to reflect the newly selected day of travel, thereby enabling the user 310 to focus on resort events occurring during the travel period being planned by the user 110 through the exemplary module 320. In such a manner, user efficiency, of both the exemplary user 110, and the exemplary user 310, can be increased through the communication of information among discrete modules directed to individual tasks of a multitask workflow.

Figure 4:
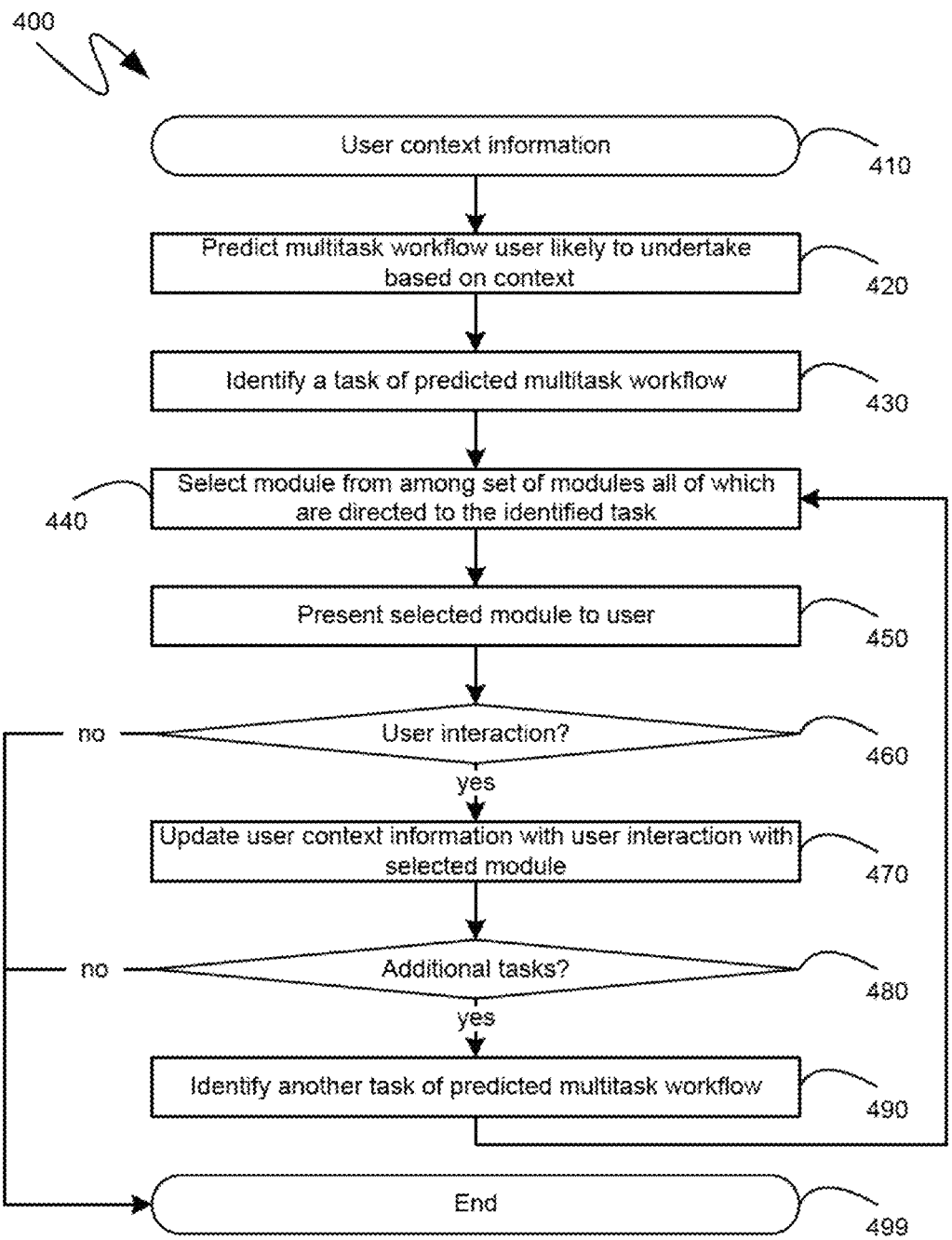
FIG. 4 is a flow diagram of a proactive presentation of multitask workflow components to a user.

Turning to FIG. 4, the exemplary flow diagram 400 shown therein illustrates an exemplary series of steps by which user efficiency and interaction performance in performing a multitask workflow can be increased through the proactive triggering and presentation of modules directed to individual tasks of such a multitask workflow. Initially, at step 410, user context information can be obtained, or monitored, for an indication that the user is likely to undertake in multitask workflow. Such a prediction, that the user will undertake a multitask workflow, can be made, at step 420, based on the user context information of step 410.

To aid the user in performing the multitask workflow, a task of the multitask workflow can be identified at step 430 and, subsequently, at step 440, the module directed to such a task can be selected for proactive presentation to the user. As indicated previously, the selection of a module, at step 440, can be based on a value associated with the module, such as in comparison with other modules that are directed to an equivalent task, namely the task identified at step 430. Such a value, as also indicated previously, can represent an incentive offered to a service providing the above-described functionality in order to entice such a service to select and proactively present a corresponding module to a user. Processing can then proceed to step 450 where the module, selected at step 440, can be proactively presented to a user.

As indicated previously, the presentation of a module to a user can entail the presentation, by the module, of a graphically engaging user interface, which can increase user interaction performance with the module and can render the user's performance of tasks to which the module is directed more efficient. However, if the user chooses not to interact with the proactively presented module, as represented by the choice of step 460, the relevant processing can end at step 499. Conversely, if, at step 460, the user proceeds to interact with the proactively presented module, user context information and other user information can be updated, at step 470, with information obtained from user interaction with the module presented at step 450. For example, and as described above, dates, times, locations and other like information can be gleaned from the user interaction with the module that was presented at step 450, and the user context information can be accordingly updated, at step 470.

Subsequently, at step 480, a determination can be made as to whether there are additional tasks of the predicted multitask workflow that remain. If no such further tasks remain, then the relevant processing can end at step 499. Conversely, if further tasks remain, then another such task can be identified, at step 490, and processing can return to step 440 where a module for the task identified at step 490 can be selected, such as from among a set of modules which are each, individually directed to such a task.

Figure 5:
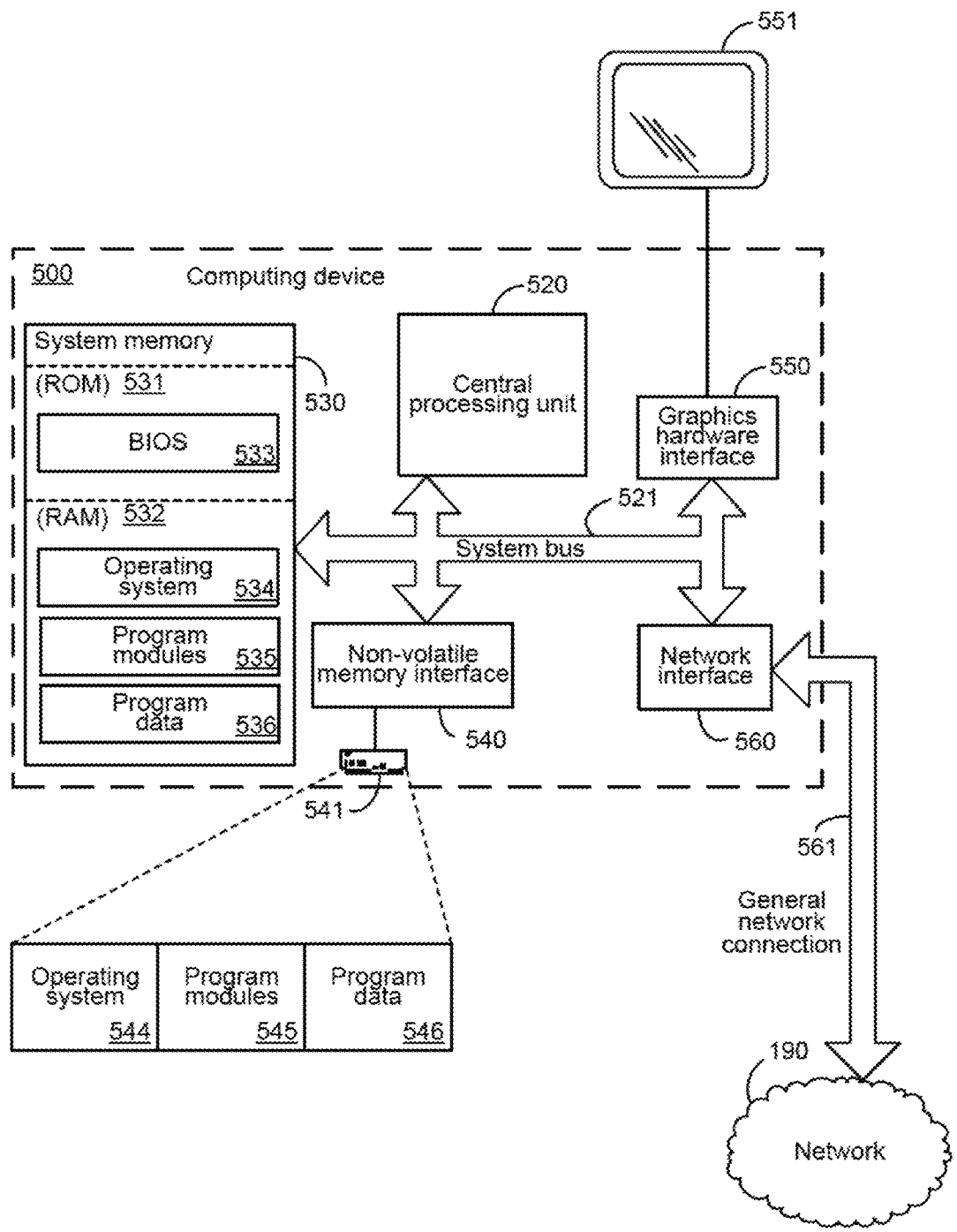
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 550 and a display device 551, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of improving user efficiency and interaction performance in multi-task workflows, the method comprising the steps of: obtaining user context information, associated with a user, the obtained user context information comprising recent interactions of the user with a first computing device; predicting, based on the obtained user context information, a multitask workflow that the user will seek to perform; selecting, from among a first set of modules, each being directed to a first task of the multitask workflow, a first module to be presented to the user through the first computing device, the selecting being based on previously determined module values assigned to each of the first set of modules; and selecting, from among a second set of modules, each being directed to a second task of the multi-task workflow, a second module to be presented, the selecting being based on previously determined module values assigned to each of the second set of modules and being based on user interaction with the first module.

A second example is the method of the first example, wherein a previously determined module value comprises a quantity of an incentive to present a corresponding module to a user.

A third example is the method of the first example, wherein a previously determined module value for one of the second set of modules is increased based upon a specific one of the first set of modules being the selected first module.

A fourth example is the method of the first example, wherein the selected second module is presented to another user through a second computing device differing from the first computing device.

A fifth example is the method of the fourth example, further comprising the steps of providing, to the selected second module, information regarding the multitask workflow selected via the first module.

A sixth example is the method of the first example, further comprising the steps of: identifying the first task of the multitask workflow based upon the recent interactions of the user with a first computing device.

A seventh example is the method of the first example, wherein the obtained user context information comprises user-centric calendar information.

An eighth example is the method of the first example, wherein the first task comprises the purchase of goods or services through the selected first module, and wherein further the first module was provided by a provider of the goods or services.

A ninth example is a computing device comprising: one or more processing units; a network interface; and one or more computer-readable media comprising computer-executable instructions which, when executed by the one or more processing units, cause the computing device to perform steps comprising: obtaining user context information, associated with a user, the obtained user context information comprising recent interactions of the user with a first computing device; predicting, based on the obtained user context information, a multitask workflow that the user will seek to perform; selecting, from among a first set of modules, each being directed to a first task of the multitask workflow, a first module to be presented to the user through the first computing device, the selecting being based on previously determined module values assigned to each of the first set of modules; and selecting, from among a second set of modules, each being directed to a second task of the multi-task workflow, a second module to be presented, the selecting being based on previously determined module values assigned to each of the second set of modules and being based on user interaction with the first module.

A tenth example is the computing device of the ninth example, wherein the computing device is remote from the first computing device, the one or more computer-readable media comprising further computer-executable instructions which, when executed by the one or more processing units, cause the computing device to perform further steps comprising: communicating the selected first module to the first computing device via the network interface.

An eleventh example is the computing device of the ninth example, wherein the one or more computer-readable media comprise further computer-executable instructions which, when executed by the one or more processing units, cause the computing device to perform further steps comprising: communicating the selected second module to a second computing device via the network interface, the second computing device differing from the first computing device and being remote from the computing device; and wherein further the selected second module is presented to another user through the second computing device.

A twelfth example is the computing device of the eleventh example, wherein the one or more computer-readable media comprise further computer-executable instructions which, when executed by the one or more processing units, cause the computing device to perform further steps comprising: providing, to the selected second module, information regarding the multitask workflow selected via the first module.

A thirteenth example is the computing device of the ninth example, further comprising a module store, the module store comprising the first set of modules and the second set of modules.

A fourteenth example is the computing device of the thirteenth example, wherein the module store comprises categorizations of modules based on tasks to which modules are directed, the first set of modules being associated with a first categorization through metadata associated with each module of the first set of modules and the second set of modules being associated with a second categorization through metadata associated with each module of the first set of modules.

A fifteenth example is the computing device of the ninth example, wherein a previously determined module value comprises a quantity of an incentive to present a corresponding module to a user.

A sixteenth example is the computing device of the ninth example, wherein a previously determined module value for one of the second set of modules is increased based upon a specific one of the first set of modules being the selected first module.

A seventeenth example is the computing device of the ninth example, further comprising a physical display device; and the selected first module; wherein the computing device is the first computing device; and wherein further the presentation of the selected first module to the user comprises executing the first module to display a user interface, on the physical display device, through which the first task is performed.

An eighteenth example is one or more computer-readable storage media comprising computer-executable instructions for improving user efficiency and interaction performance in multi-task workflows, the computer-executable instructions, when executed by one or more processing units, cause the processing units to perform steps comprising: obtaining user context information, associated with a user, the obtained user context information comprising recent interactions of the user with a first computing device; predicting, based on the obtained user context information, a multitask workflow that the user will seek to perform; selecting, from among a first set of modules, each being directed to a first task of the multitask workflow, a first module to be presented to the user through the first computing device, the selecting being based on previously determined module values assigned to each of the first set of modules; and selecting, from among a second set of modules, each being directed to a second task of the multi-task workflow, a second module to be presented, the selecting being based on previously determined module values assigned to each of the second set of modules and being based on user interaction with the first module.

A nineteenth example is the computer-readable storage media of the eighteenth example, wherein the selected second module is presented to another user through a second computing device differing from the first computing device.

A twentieth example is the computer-readable storage media of the nineteenth example, wherein the one or more computer-readable storage media comprise further computer-executable instructions which, when executed by the one or more processing units, cause the one or more processing units to perform further steps comprising: providing, to the selected second module, information regarding the multitask workflow selected via the first module.

As can be seen from the above descriptions, mechanisms for increasing user efficiency and interaction performance through the proactive triggering of modules directed to specific tasks of a multitask workflow have been presented. In view of the many possible variations of the subject matter described herein, we claim as our invention all such embodiments as may come within the scope of the following claims and equivalents thereto.

We claim:

1. A method of improving user efficiency and interaction performance in multi-task workflows, the method comprising the steps of:
   obtaining user context information, associated with a user, the obtained user context information comprising recent interactions of the user with a first computing device;
   selecting, based on the obtained user context information, a multitask workflow, from among a set of pre-defined multitask workflows, that the user is predicted to perform, wherein each of the pre-defined multitask workflows comprises multiple pre-defined tasks;
   selecting, from among a first set of modules, each being directed to a first task of the selected multitask workflow, a first module to be presented to the user through the first computing device, the selecting being based on previously determined module values assigned to each of the first set of modules;
   selecting, from among a second set of modules, each being directed to a second task of the multi-task workflow, a second module to be presented through a second computing device differing from the first computing device, the selecting being based on previously determined module values assigned to each of the second set of modules and being based on user interaction with the first module;
   receiving data from the selected first module indicative of user interaction with the selected first module; and
   providing the received data to the selected second module;
   wherein the first and second modules are presented concurrently on the first and second computing devices.

2. The method of claim 1, wherein a previously determined module value comprises a quantity of an incentive to present a corresponding module to a user.

3. The method of claim 1, wherein a previously determined module value for one of the second set of modules is increased based upon a specific one of the first set of modules being the selected first module.

4. The method of claim 1, wherein the selected second module is presented to another, different user through the second computing device.

5. The method of claim 4, further comprising the steps of providing, to the selected first module, data indicative of user interaction with the second module.

6. The method of claim 1, further comprising the steps of: identifying the first task of the multitask workflow based upon the recent interactions of the user with a first computing device.

7. The method of claim 1, wherein the obtained user context information comprises user-centric calendar information.

8. The method of claim 1, wherein the first task comprises the purchase of goods or services through the selected first module, and wherein further the first module was provided by a provider of the goods or services.

9. A computing device comprising:
   one or more processing units;
   a network interface; and
   one or more computer-readable media comprising computer-executable instructions which, when executed by the one or more processing units, cause the computing device to perform steps comprising:
      obtaining user context information, associated with a user, the obtained user context information comprising recent interactions of the user with a first computing device;
      selecting, based on the obtained user context information, a multitask workflow, from among a set of pre-defined multitask workflows, that the user is predicted to perform, wherein each of the pre-defined multitask workflows comprises multiple pre-defined tasks;
      selecting, from among a first set of modules, each being directed to a first task of the selected multitask workflow, a first module to be presented to the user through the first computing device, the selecting being based on previously determined module values assigned to each of the first set of modules;
      selecting, from among a second set of modules, each being directed to a second task of the multi-task workflow, a second module to be presented through a second computing device differing from the first computing device, the selecting being based on previously determined module values assigned to each of the second set of modules and being based on user interaction with the first module;
      receiving data from the selected first module indicative of user interaction with the selected first module; and
      providing the received data to the selected second module;
   wherein the first and second modules are presented concurrently on the first and second computing devices.

10. The computing device of claim 9, wherein the computing device is remote from the first and second computing devices, the one or more computer-readable media comprising further computer-executable instructions which, when executed by the one or more processing units, cause the computing device to perform further steps comprising: communicating the selected first module to the first computing device via the network interface and communicating the selected second module to the second computing device via the network interface.

11. The computing device of claim 9, wherein the selected second module is presented to another, different user through the second computing device.

12. The computing device of claim 11, wherein the one or more computer-readable media comprise further computer-executable instructions which, when executed by the one or more processing units, cause the computing device to perform further steps comprising: providing, to the selected first module, data indicative of user interaction with the second module.

13. The computing device of claim 9, further comprising a module store, the module store comprising the first set of modules and the second set of modules.

14. The computing device of claim 13, wherein the modules store comprises categorizations of modules based on tasks to which modules are directed, the first set of modules being associated with a first categorization through metadata associated with each module of the first set of modules and the second set of modules being associated with a second categorization through metadata associated with each module of the first set of modules.

15. The computing device of claim 9, wherein a previously determined module value comprises a quantity of an incentive to present a corresponding module to a user.

16. The computing device of claim 9, wherein a previously determined module value for one of the second set of modules is increased based upon a specific one of the first set of modules being the selected first module.

17. The computing device of claim 9, further comprising a physical display device; and the selected first module; wherein the computing device is the first computing device; and wherein further the presentation of the selected first module to the user comprises executing the first module to display a user interface, on the physical display device, through which the first task is performed.

18. One or more computer-readable storage media comprising computer-executable instructions for improving user efficiency and interaction performance in multi-task workflows, the computer-executable instructions, when executed by one or more processing units, cause the processing units to perform steps comprising:
obtaining user context information, associated with a user, the obtained user context information comprising recent interactions of the user with a first computing device;
selecting, based on the obtained user context information, a multitask workflow, from among a set of pre-defined multitask workflows, that the user is predicted to perform, wherein each of the pre-defined multitask workflows comprises multiple pre-defined tasks;
selecting, from among a first set of modules, each being directed to a first task of the selected multitask workflow, a first module to be presented to the user through the first computing device, the selecting being based on previously determined module values assigned to each of the first set of modules;
selecting, from among a second set of modules, each being directed to a second task of the multi-task workflow, a second module to be presented through a second computing device differing from the first computing device, the selecting being based on previously determined module values assigned to each of the second set of modules and being based on user interaction with the first module;
receiving data from the selected first module indicative of user interaction with the selected first module; and
providing the received data to the selected second module;
wherein the first and second modules are presented concurrently on the first and second computing devices.

19. The computer-readable storage media of claim 18, wherein the selected second module is presented to another, different user through the second computing device.

20. The computer-readable storage media of claim 19, wherein the one or more computer-readable storage media comprise further computer-executable instructions which, when executed by the one or more processing units, cause the one or more processing units to perform further steps comprising: providing, to the selected first module, data indicative of user interaction with the second module.

* * * * *